United States Patent [19]

Isao et al.

[11] Patent Number: 5,462,233
[45] Date of Patent: Oct. 31, 1995

[54] PROCESS FOR RECYCLING EXPANDED PARTICLE MOLDINGS

[75] Inventors: Kiba Isao; Kaneko Masamichi, both of Suzuka, Japan

[73] Assignee: Asahi Kasei Kogyo Kabushiki Kaisha, Osaka, Japan

[21] Appl. No.: 193,005

[22] PCT Filed: Aug. 10, 1993

[86] PCT No.: PCT/JP93/01121

§ 371 Date: Feb. 16, 1994

§ 102(e) Date: Feb. 16, 1994

[87] PCT Pub. No.: 94/03323

PCT Pub. Date: Feb. 17, 1994

[30] Foreign Application Priority Data

Aug. 10, 1992 [JP] Japan ................... 4-232628

[51] Int. Cl.⁶ ................................ B02C 23/18
[52] U.S. Cl. .............. 241/18; 241/29; 264/37; 264/344
[58] Field of Search ............ 264/37, 344, DIG. 69; 241/23, 18, 29

[56] References Cited

U.S. PATENT DOCUMENTS

| | | | |
|---|---|---|---|
| 4,003,881 | 1/1977 | Sidebotham et al. | 264/344 |
| 4,028,159 | 6/1977 | Norris | 264/37 |
| 4,091,967 | 5/1978 | Kinoshita . | |
| 4,839,392 | 6/1989 | Kromrey | 264/37 |
| 5,198,471 | 3/1993 | Naamau et al. | 264/37 |
| 5,217,660 | 6/1993 | Howard | 264/37 |
| 5,286,424 | 2/1944 | Su et al. | 264/37 |
| 5,290,505 | 3/1994 | Huber et al. | 264/37 |

FOREIGN PATENT DOCUMENTS

| | | |
|---|---|---|
| 0430199 | 6/1991 | European Pat. Off. . |
| 0547249 | 6/1993 | European Pat. Off. . |
| 2462040 | 6/1976 | Germany . |
| 52-119687 | 10/1977 | Japan . |
| 63-83145 | 4/1988 | Japan . |
| 3-278939 | 12/1991 | Japan . |
| 9303089 | 2/1993 | WIPO . |

OTHER PUBLICATIONS

Derwent Abstract of Soviet Union 654,641 printed Mar. 1979.

*Primary Examiner*—Robert B. Davis
*Attorney, Agent, or Firm*—Birch, Stewart, Kolasch & Birch

[57] ABSTRACT

The present invention relates to a process for recovering recyclable expanded particles from expanded particle moldings including expanded particles of a synthetic resin coated with thermoplastic resin (interfacial material) whose melting point is lower than that of the synthetic resin of the expanded particles or whose solubility is different from that of the synthetic resin of the expanded particles. The process includes the steps of softening or melting the interfacial material by heating or dissolving it with a solvent, and separating the expanded particle molding into individual particles by applying a shearing force thereto under circumstances such that the bond strength among the expanded particles in the molding is weakened.

16 Claims, 3 Drawing Sheets

PROCESS FOR RECYCLING EXPANDED PARTICLE MOLDINGS

TECHNICAL FIELD

The present invention relates to a process for recovering recyclable expanded particles from expanded particle moldings comprising expanded particles coated with specific interfacial material. The expanded particles comprise polyolefin and the like. Recyclable expanded particles are recovered from moldings produced thereof by the steps comprising melting, softening or dissolving the interfacial material and separating into individual particles.

BACKGROUND ART

Expanded particles of synthetic resins such as polystyrene, polyethylene and polypropylene are molded in various forms and widely used as packing medium, cushioning medium and insulation. After being used, expanded particle moldings are generally crushed with a crusher and then burnt up or buried under the ground. When the resins are burnt up, environmentally harmful gases such as carbon monoxide and carbon dioxide are generated in a large amount, and resins including chloride and nitrogen generate various types of gases poisonous to living things. Also, it is necessary to secure land to bury crushed resins under the ground. For the purpose of recycling the crushed resins, expanded particle moldings produced from the same resin must be collected. It requires a great deal of labor to select resins.

Japanese Patent Application Laid-Open Nos. 83145/1988 and 119687/1977 disclose a process for recovering recyclable resin chips from expanded particle moldings. The process comprises crushing expanded particle moldings comprising, for example, polystyrene or polyethylene, heat-melting the crushed expanded particle moldings to remove gas generated from the particles present in the melted resin, extruding the melted resin in a filament form and cutting the extruded resin into proper sizes. The recovered resin chips, however, have the drawbacks in that moldings of good quality cannot be produced therefrom because the resin chips have lost, in the recovering process, their suitable properties for expansion due to deterioration during heating and mixing of foreign substances therewith.

Japanese Patent Application Laid-Open No. 278939/1991 and German Offenlegungsshrift No. 2,462,040 disclose a process for mechanically separating expanded particles from expanded particle moldings of polystyrene or polyethylene and the like in a crusher. According to this process, expanded particle moldings are directly crushed by mechanical force. As a result, the recovered expanded particles tend to be mechanically damaged. Moreover, in this process, individual expanded particles are not completely separated so that there remain blocks of the expanded particles.

An object of the present invention is to solve the above problems and to provide a process for recovering recyclable expanded particles from used expanded particle moldings comprising synthetic resin, without producing bad effects on the environment.

DISCLOSURE OF THE INVENTION

The present invention relates to a process for recovering expanded particles from expanded particle moldings comprising expanded particles of a synthetic resin coated with a thermoplastic resin (interfacial material) whose melting point is lower than that of the synthetic resin of expanded particles or whose solubility is different from that of the synthetic resin of expanded particles, which process comprises the steps of softening or melting the interfacial material by heating or dissolving it with a solvent, and separating into individual particles by applying a shearing force under circumstances such that the bond strength among the expanded particles is weakened.

The resin suitable for recyclable expanded particles recovered from expanded particle moldings include:

(1) the resins whose permeability of gas released as blowing agents is in the following range:
$Pe_{(N_2)} \geqq 0.2\times10^{-10}$ cm$^3$·cm/cm$^2$·sec·cmHg and
$Pe_{(C_3H_8)} \geqq 0.5\times10^{-10}$ cm$^3$·cm/cm$^2$·sec·cmHg; or (2) the resins whose permeability of gas released as blowing agents is in the following range:
$Pe_{(N_2)} < 0.2\times10^{-10}$ cm$^3$·cm/cm$^2$·sec·cmHg and
$Pe_{(C_3H_8)} < 0.5\times10^{-10}$ cm$^3$·cm/cm$^2$·sec·cmHg In the above equations, $Pe_{(N_2)}$ and $Pe_{(C_3H_8)}$ represent transmission coefficients of nitrogen gas and propane gas at 25° C., respectively.

The synthetic resins used for the expanded particles in the present invention include polyolefin, copolymer of olefin and vinyl monomer, vinyl polymer, vinylidene polymer and diene polymer. The polyolefin includes, for example, low density polyethylene, medium density polyethylene, high density polyethylene, low density linear polyethylene, ultralow density linear polyethylene and polypropylene. The copolymer of olefin and vinyl monomer includes, for example, ethylene-vinyl acetate copolymer, ethylene-vinyl chloride copolymer, ethylene-ethylacrylate copolymer, ethylene-methylacrylate copolymer, propylene-ethylene copolymer, propylene-butene copolymer and propylene-1, 4-methyl-pentene copolymer. The vinyl polymer includes, for example, polyvinyl chloride and its copolymer, polystyrene and its copolymer, and acrylonitrile-butadiene-styrene copolymer. The vinylidene polymer includes, for example, polyvinylidene chloride and its copolymer. The diene polymer includes, for example, polybutadiene and its copolymer. Of these, amorphous vinylidene chloride copolymers which comprise vinylidene chloride and at least one type of copolymerizable vinyl monomers with vinylidene chloride, contain 30 wt. % or more of vinylidene chloride and have a glass transition temperature of 85° C. are preferred. The synthetic resin may be cross-linked. Representative examples of the cross-linked resins are crosslinked polyolefins. Of these, polyolefins satisfying condition (1) and polyvinylidene chlorides satisfying condition (2) are preferred.

In the present invention, for the purpose of recovering recyclable expanded particles, it is necessary to use expanded particle moldings comprising the expanded particles coated with a specific interfacial material.

The interfacial material used in the present invention is a thermoplastic resin whose melting point or softening point is lower than that of the synthetic resin of the expanded particles or a thermoplastic resin whose solubility is different from that of the synthetic resin.

The former resins include, for example, a resin which is the same kind as the resin of the expanded particles, a chlorinated polyolefin, an unsaturated fatty ester polymer such as an acrylate, a copolymer containing the unsaturated fatty ester and ethylene and polyurethane.

The interfacial material preferably has a lower melting point than that of the resin of the expanded particles lower by 5° to 30° C. When the difference in the melting point is less than 5° C., the expanded particles themselves are apt to partially melt upon the melting or softening the interfacial material. As a result, the recovered expanded particles tend to be deteriorated. When the difference in the melting point is more than 30° C., the bond strength between the expanded particles and the interfacial material is apt to lower. Preferred combinations of the expanded particles and the interfacial material include low density polyethylene and an interfacial material having a lower melting point than that of the low density polyethylene by 5° to 30° C.; polypropyrene and an interfacial material having a lower melting point than that of the polypropyrene by 5° to 30° C.; and a random or block copolymer of propylene/vinyl monomer and an interfacial material having a lower melting point than that of the copolymer by 5° to 30° C.

In case of the latter resin, a combination of the interfacial material, the resin of expanded particles and a solvent has to be selected so as to dissolve or swell the interfacial material but not the resin of the expanded particles. Preferable combinations include a combination of cross-linked polyethylene, a polyurethane resin adhesive and toluene as an expanded particle, an interfacial material and a solvent, respectively; and a combination of the resin comprising vinylidene chloride, acrylonitrile and styrene in a ratio of 45/45/10 or 50/30/20 (mole %) as an expanded particle and 5 wt. %-methylethylketone solution of vinyl chloride (RM-5201; manufactured by Chisso Co., Ltd.), 5 wt. %-toluene solution of polymethyl methacrylate (Delpet 560F; manufactured by Asahi Chemical Industry Co., Ltd.) or acrylic aqueous emulsion (solids content of 56 wt. %) (SP210; manufactured by Konishi Co., Ltd.) as the interfacial material.

The amount of the interfacial material based on the weight of the expanded particles is preferably in the range of 0.05 to 20 wt. %, more preferably 3 to 20 wt. %. When it is under 0.05 wt. %, it is not always sufficient to weaken the bond strength among the expanded particles. When it is over 20 wt. %, the expanded particles coated with interfacial material readily adhere each other. As a result, it is apt to be difficult to handle the particles since the expanded particles aggregate.

Figure 1:
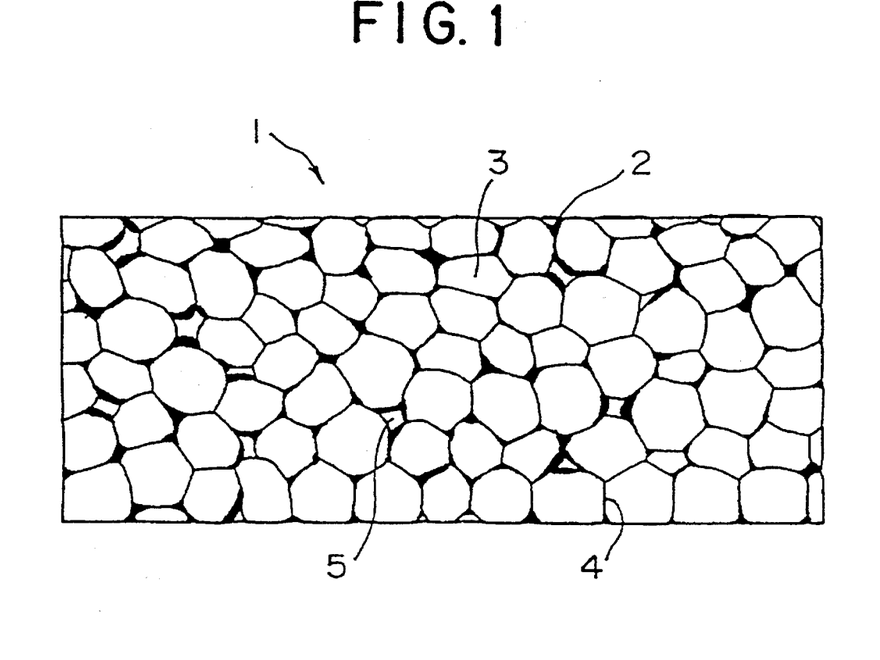
FIG. 1 is a cross-section view of the expanded particle moldings used in the process of the present invention.

One of the expanded particle moldings used in the present invention is shown in FIG. 1. The expanded particles 3 coated with an interfacial material 2 form the expanded particle moldings 1 by bonding each other through the interfacial material. It is not necessary to coat the whole surface of the expanded particles with the interfacial material. There remains a portion 4 where the expanded particles directly bond each other in the expanded particle moldings.

Void 5 is formed among the expanded particles in the moldings when there is a portion where the interfacial material is not adhered to the surface of the expanded particles. The void will be a path for a heating medium or a solvent when the interfacial material is softened, melted or dissolved. The ratio of void occupying in the expanded particle moldings (void volume) is preferably in the range of 0.5 to 40%, more preferably 3 to 30%. When it is under 0.5%, steam and solvents do not easily infiltrate into the inside of the moldings. When it is over 40%, the strength of the moldings tends to lower.

A process for producing the expanded particle moldings used in the present invention comprises the following:

(1) An expanded particle of polyethylene can be produced by known methods described in Japanese Patent Publication Nos. 41777/1977 and 30431/1977. Extruded polyethylene in the form of strings having diameter of 0.5 to 1.5 mm is cut into a length of 1.5 to 2.5 mm. If necessary, they are cross-linked with a cross-linking agent such as dicumyl peroxide. A volatile blowing agent such as dichloro-difluoromethane and resin particles are put in a pressure vessel, then heated at between 70° C. and 90° C. for between 0.5 and 2 hours to impregnate the resin particles with the blowing agent. The resultant particles are charged into an expansion apparatus and heated with a steam of 0.4 to 0.7 kg/cm$^2$G for 30 to 60 seconds. On the other hand, an expanded particle of vinylidene chloride can be produced by the known method as described in Japanese Patent Application Laid-Open No. 170433/1988. Particles of vinylidene chloride are impregnated with volatile gas of a blowing agent in vapor or liquid phase in an autoclave to obtain expandable particles. Then, they are expanded by heating with a heating medium such as steam and warm water to obtain preliminary expanded particles.

(2) When the interfacial material is a powder, the expanded particles obtained in the above (1) and the interfacial material are put in a mixer with heating at temperatures equal to or between the melting point of the interfacial material and that of the resin of expanded particles. Then, the heating temperature is lowered with stirring to take out expanded particles coated with the interfacial material from the mixer. The interfacial material is preferably powder or flakes having an average particle size of 100 mesh or less. Preferable mixers are those which have a temperature controller and rotors such as a plow share mixer and a Henschel mixer. When the interfacial material is used in the form of an emulsion or a solution, the interfacial material and expanded particles are mixed in a mixer at room temperature.

(3) When moldings are prepared by using expanded particles of the resin having high gas permeability such as polyolefin, a step for giving expandability to the expanded particles is required before molding in a mold. For example, an expanding process comprising putting expanded particles of olefin into a mold with many small holes which can be closed but not sealed under the same pressurized condition as in the mold, releasing the pressure and heating the particles with steam introduced through the holes; an expanding process comprising supplementing expanded particles with compressed air, putting the particles into a mold immediately and heating them with steam; and an expanding process comprising pressurizing expanding particles in a mold and heating them with steam. On the other hand, when a resin having low gas permeability such as vinylidene chloride is used, moldings are prepared with the steps of filling a mold with the expanded particles, heating the particles with steam introduced into the mold through the holes to expand and fuse them, and quickly cooling them.

Recyclable expanded particles can be recovered from the expanded particle moldings used for packing mediums, cushioning mediums and the like according to the following method.

The expanded particle moldings used in the present invention are composed of the expanded particles coated with interfacial material. When the expanded particles are recovered, shearing force is applyed to the expanded particle moldings to mechanically separate individual particles under circumstances such that the interfacial material is softened or melted by heating or dissolved with a solvent capable of dissolving the interfacial material but not the resin of the expanded particles.

The conditions at which the interfacial material are softened, melted or dissolved are different, according to the combination of the resin of expanded particles and the interfacial material. When the interfacial material is softened or melted, the interfacial material is preliminarily melted at various temperatures to decide a temperature at which expanded particles are separated by shearing force without mechanical damage. Melting or softening the interfacial material is preferably carried out at or below the melting point of the resin of expanded particles. Steam is preferably used as a heating medium. The steam rapidly enters the inside of the expanded particle moldings along voids therein. As a result, the interfacial material becomes soft and the bond strength among the expanded particles is weakened.

When the interfacial material is dissolved, it is also necessary to preliminarily dissolve the interfacial material with various kinds of solvents and select a solvent suitable for separating the individual expanded particles. The interfacial material is dissolved so as to separate individual expanded particles without mechanical damage when the shearing force is applyed. The solvent follows along the voids in the moldings to weaken the bond strength among the expanded particles with the infiltration of the solvent.

A melting or softening method with heat is preferred to a dissolving method with a solvent since the melting or softening method does not require waste disposal of used solvents.

The bond strength of the expanded particles corresponds to their tensile strength according to JIS K 6767. Under the circumstance that the interfacial material is softened, melted or dissolved, the tensile strength is 0 to 0.5 kg/cm$^2$, preferably 0 to 0.2 kg/cm$^2$. Consequently, the conditions for softening, melting or dissolving the interfacial material, i.e., a heating temperature or types of solvents, are decided so as to achieve the above-mentioned value of the tensile strength of the expanded particles.

Shearing force is applyed to the expanded particle moldings whose bond strength is weakened. The expanded particles are separated from the surface of the expanded particle moldings one after another by touching rotating rotors or rotary brushes.

Figure 2:
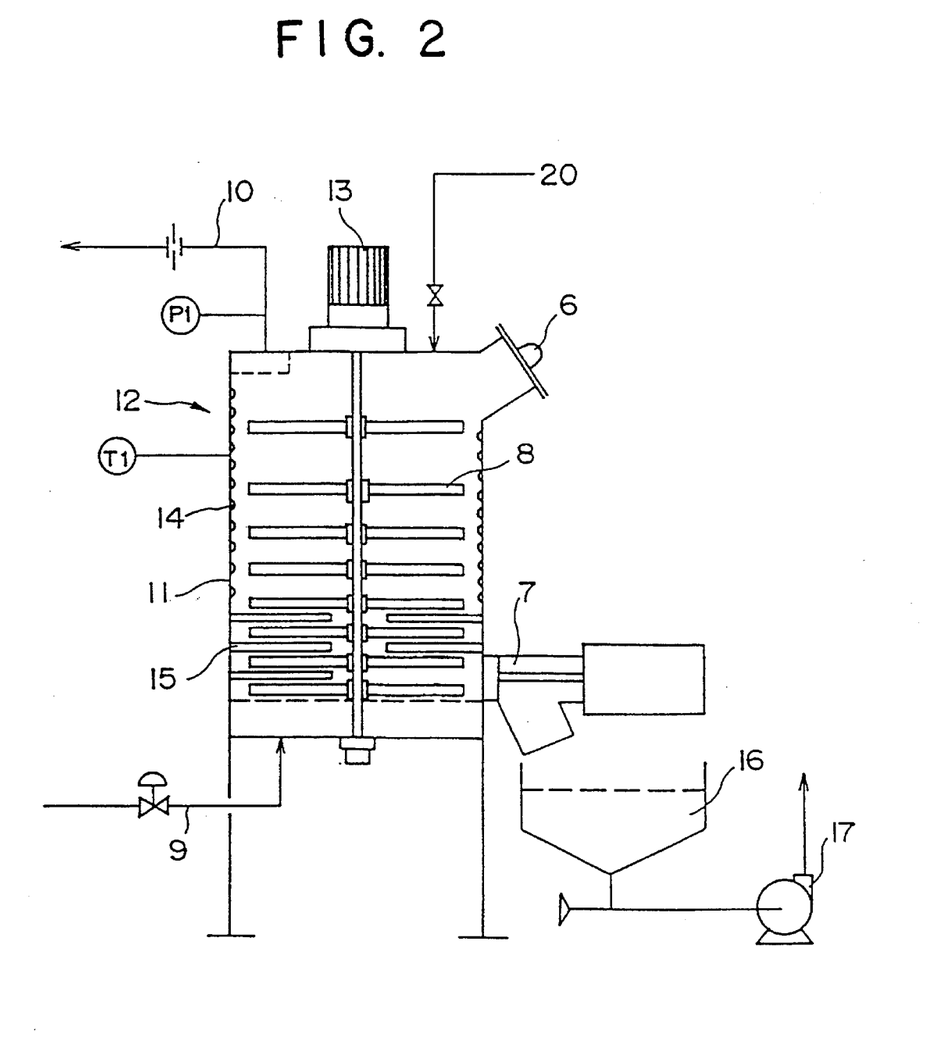
FIG. 2 is a schematic representation of an apparatus used in the process of the present invention.

FIG. 2 gives an example of apparatuses for separating expanded particles from expanded particle moldings by softening or melting the interfacial material. The expanded particle moldings are provided from a supply port 6. A tank 11 is heated by supplying steam from a steam tube 9. When the inside of the tank is a prescribed temperature and the interfacial material begins softening or melting, an agitator 12 equipped with plural propellers 8 composed of metal wings is started with a motor 13. An interval between the propellers near the supply port, i.e., in the upper part of the tank, is big, and the one in the lower part is small. Expanded particles are separated from the surface of expanded particle moldings one after another upon touching the rotating propellers. For the purpose of improving separate efficiency, many projections 14 may be set up on the inside wall of the tank, or sticks 15 may be set up so as not to touch the propellers.

With the progress of separating expanded particles, the volume of the expanded particle moldings decreases gradually. As a result, the moldings move towards the bottom of the tank, then expanded particles are separated by rotors set up at small intervals. The separated expanded particles are taken out from an outlet 7. The outlet 7 is opened and shut by cylinder. The thus obtained expanded particles are put through a sieve in a receptacle 16, then moved to the next step by a transport blower 17. A line 20 is for introducing air to blow away the residual particles in the tank. The tank is preferably equipped with a thermal detector and a pressure detector to control the conditions for separation.

The rotating speed of an agitator may be decided according to the material of the expanded particles. Preferably, it is in the range of 25 to 500 r.p.m. In order to prevent the expanded particles from damage, it is preferred that the moldings should be heated by supplying steam into the tank before the agitator is started. A stirring period is preferably from 2 to 10 minutes. When it is under 2 minutes, separation is apt to insufficient. When it is over 10 minutes, the separated particles tend to shrink.

Figure 3A:
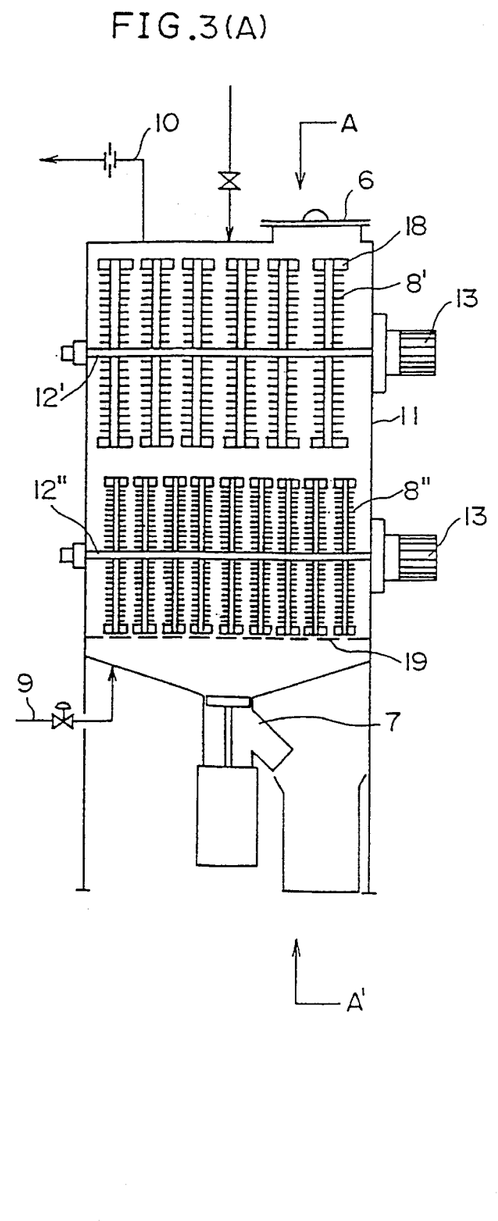
FIG. 3(A) is a schematic representation of another apparatus used in the process of the present invention and FIG. 3(B) is a partial schematic representation of the cross-section of FIG. 3(A) taken along line A–A'.
Figure 3B:
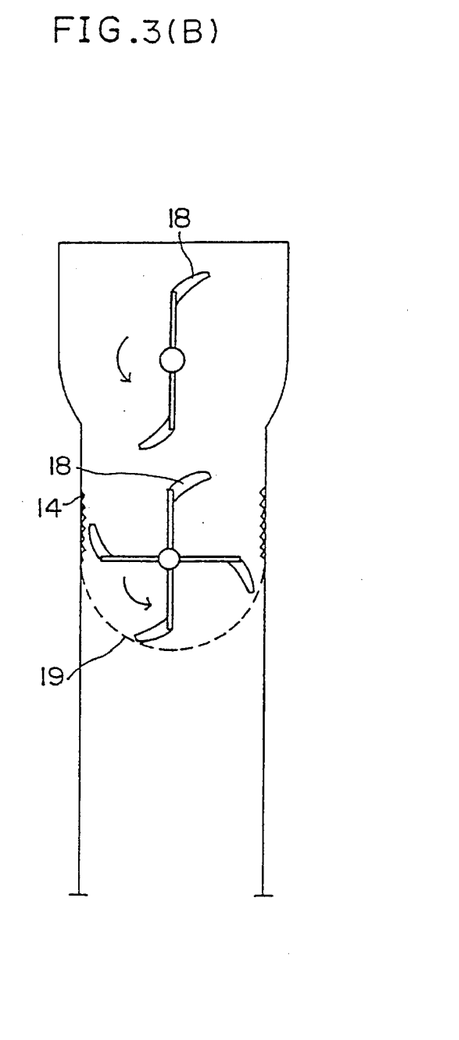

FIG. 3(A) and 3(B) show another apparatus for separation which is used in the present invention. Agitators 12' and 12" with propellers 8' and 8" composed of metal brushes are set up horizontally in a tank. The propeller 8" is composed of brushes having higher density than those of the propeller 8'. The propellers have bow plates 18 at their ends to improve separate efficiency. The bow plate of the propeller 8" is used for separating aggregations of the expanded particles by rubbing them against a mesh plate shaped into a circular arc 19. The separated expanded particles pass through the mesh plate and fall on the bottom of the tank. If necessary, many projections 14 may be set up on the inside wall of the tank. This type of apparatus is preferably used for separation of the moldings in which the bond strength among the expanded particles is so strong that it is rather difficult to separate the expanded particles.

When expanded particles are separated from expanded particle moldings by dissolving the interfacial material with a solvent, the moldings are first sprayed or wetted with the solvent and provided in an apparatus as described in FIG. 3(A) to separate particles by rotating an agitator.

Usually, separation can be conducted at room. temperature. If necessary, it may be conducted under heating.

The thus obtained recycled expanded particles according to the process of the present invention are rarely damaged and have a similar expansion ratio to the virgin expanded particles. Accordingly, they can be molded into expanded particle moldings as well as ordinary expanded particles. The ratio S of the expansion ratio of the recycled expanded particles to that of the virgin expanded particles is preferably $0.7 \leq S \leq 1.3$, more preferably $0.85 \leq S \leq 1.15$. Moldings having substantially the same quality as those made of the virgin expanded particles can be produced by using the recycled particles with the virgin particles. When the difference between these ratios is too large, appearance of the moldings becomes poor due to the difference in diameters of both the particles.

BEST MODE FOR CARRYING OUT THE INVENTION

The present invention is now described in more detail by referring to Examples, but the scope thereof is not restricted by them.

In Examples and Comparative Examples, each characteristic of expanded particles and expanded particle moldings was determined as follows:

(1) True Density of Expanded Particles

About 5 g of expanded particles were weighed to the one hundredth's place. 50 to 100 cm³ of water was put in a 200 cm³ glass measuring cylinder graduated in 1 cm³. Next, a wire netting press plate having a slightly smaller diameter than that of the cylinder with a 15 to 30 cm wire standing erect on the center of the press plate was sunk into the water to give a measured water level $H_1$ (cm³). After pulling the press plate out, the weighed expanded particles were put in the cylinder and completely sunk using the press plate to give a measured water level $H_2$ (cm³). The true density of the expanded particles $\rho$ (g/cm³) was calculated according to the following equation:

$$\rho = W/(H_2 - H_1)$$

wherein, W represents weight of the expanded particles (g), $H_1$ and $H_2$ represent water levels (cm³) before and after sinking, respectively.

(2) Bulk Density of Expanded Particle Moldings

Bulk density of expanded particle moldings D (g/cm³) was measured according to the following equation based on JIS K 6767:

$$D = G/V$$

wherein G and V represent weight (g) and volume (cm³) of the expanded particle moldings, respectively.

(3) Void Volume of Expanded Particle Moldings

The length of each side of expanded particle moldings having a size of about 10 cm×about 10 cm×about 5 cm was measured to the one hundredth's place by using vernier calipers, and apparent volume was calculated by using the obtained length. 500 cm³ of water was put in a measuring water tank graduated in 0.1 cm having exact inner measures of 12 cm×6 cm (base)×20 cm (height) and 1 cm³ of surfactant (manufactured by Kao Corporation) was added to the water tank. Then, a wire netting press plate having a diameter of about 5 cm with 15 to 30 cm wire standing erect on the center of the press plate was sunk into the water to give a measured water level $C_1$ (cm). After pulling the press plate out, one of the measured moldings was put into the water and was sunk completely using the press plate to give a measured water level $C_2$ (cm). Void volume of the moldings X (%) was calculated according to the following equations:

$$B = (C_2 - C_1) \times 6 \times 12 = 72(C_2 - C_1)$$

$$X = (A - B)/A \times 100 \ (\%)$$

wherein A and B represent apparent volume and true volume of expanded particle moldings, respectively.

(4) Percentage of Closed Cell of Moldings Made of Recycled Expanded Particles

Percentage of closed cells was measured by using an air pycnometer according to ASTM D-2856.

(Evaluation)

⊚: 90% or more

○: 80 to less than 90%

Δ: 60 to less than 80%

X: less than 60%

(5) Degree of conversion of Moldings into Particles

Many small blocks of expanded particle moldings having a size of about 100 mm×100 mm×50 mm were prepared. Ten of these blocks were put in an autoclave having inner volume of 20 liters with 4 sets of rotaries along the axis of rotation. The moldings were heated for two minutes with stirring at 300 r.p.m. in the autoclave to separate expanded particles from the surface of the moldings. The thus obtained recycled expanded particles were recovered and their total volume was measured. Degree of conversion of moldings into particles D (%) was calculated according to the following equation:

$$D = F/E \times 100 \ (\%)$$

wherein E and F represent total volume of the expanded particle moldings and the obtained recycled expanded particles (cm³), respectively.

(Evaluation)

⊚: 90% or more

○: 80 to less than 90%

Δ: 60 to less than 80%

X: less than 60%

(6) Expansion Ratio

Expansion ratio (S) was calculated by using true density of the recycled expanded particles and virgin expanded particles obtained in (1).

$$S = \rho B/\rho A$$

wherein $\rho A$ and $\rho B$ represent true density of the virgin expanded particles and the recycled expanded particles, respectively.

(Evaluation)

⊚: $0.95 \leq S \leq 1.05$

○: $0.85 \leq S < 0.95$ or $1.05 < S \leq 1.15$

Δ: $0.70 \leq S < 0.85$ or $1.15 < S \leq 1.30$

X: $S < 0.7$ or $1.3 < S$ (7) Blocking Tendency of Expanded Particles in the Process for Recycling The ratio of the total weight of aggregated expanded particles composed of 4 expanded particles, or more, which appeared upon recovering recycled expanded particles to the total weight of the expanded particles was evaluated by the following standard:

(Evaluation)

⊚: less than 1 wt. %

○: 1 to less than 5 wt. %

Δ: 5 to less than 20 wt. %

X: 20 wt. % or more

EXAMPLE 1

10 kg of chopped strands of low density polyethylene (manufactured by Asahi Chemical Industry Co., Ltd. under the trade name of Suntec® LD; melting point: 117° C.; $Pe_{(N_2)}=0.6\times10^{-10}$ cm³·cm/cm²·sec·cmHg; $Pe_{(C_3H_8)}=4\times10^{-10}$ cm³·cm/cm²·sec·cmHg) were impregnated with an aqueous suspension comprising 0.07 kg of dicumyl peroxide as a cross-linking agent, 0.12 kg of a blocking inhibitor and 11 kg of water. The cross-link was facilitated by heating the above suspension at 160° C. for 45 minutes to obtain particles of cross-linked resin having a gel ratio of 50% and an average particle diameter of 1.2 mm.

10 kg of the obtained particles of cross-linked resin and 10 liters of dichlorofluoromethane solution as a volatile blowing agent (20° C.) were placed in a pressure vessel, heated to 80° C. with stirring and subjected to an impregnation treatment for 1 hour at that temperature to obtain expandable particles. Then, the expandable particles were charged into an expanding tank, heated with a steam of 0.55 kg/cm$^2$G for 40 seconds to obtain expanded cross-linked polyethylene particles having a true density of 0.25 g/cm$^3$.

The expanded particles were placed in Henschel mixer FM-20B (manufactured by Mitsui Miike Kakoki Co., Ltd.) and their surface temperature was adjusted to be between 112° C. to 114° C. under stirring with high shearing force (1400 r.p.m., wind velocity of 19.4 m/sec.). As an interfacial material, 6 wt. % of powder polyethylene (manufactured by Asahi Chemical Industry Co., Ltd. under the trade name of Suntec® LD; melting point: 104° C.; the whole quantity passed through a 120-mesh screen) based on the total weight of the expanded particles was supplied little by little to the surface of the expanded particles in a fluidized state over 1 minute and the particles allowed to continue mixing for 4 minutes. While the rotating speed of the mixer was reduced to 500 r.p.m. (wind velocity of 6.9 m/sec.), the surface temperature of the expanded particles in a fluidized state was brought down to 95° C. to obtain the expanded particles whose whole surface was firmly coated with the interfacial material.

The resultant expanded particles were placed in a pressure vessel to provide expandability by treating at 80° C. for 8 hours under nitrogen gas of 15 kg/cm$^2$G. The obtained particles were charged into an expanding tank, and expanded with a steam of 0.65 kg/cm$^2$G for 20 seconds to obtain expanded particles having a true density of 0.066 g/cm$^3$. Further, the thus obtained particles were charged into a pressure vessel, and provided expandability by treating at 80° C. for 8 hours under nitrogen gas of 15 kg/cm$^2$G. The obtained particles were charged into an expanding tank, and expanded with a steam of 0.65 kg/cm$^2$G for 12 seconds to obtain expanded particles having a true density of 0.035 g/cm$^3$.

The resultant expanded particles were placed in a pressure vessel to compress them to 70% of their bulk volume (compressibility of 30%) with cold compressed air. While keeping this compression, the compressed expanded particles were press-charged into a known mold for expanded particles having inner measures of 100 mm×100 mm×50 mm and the pressure was released. Then, the particles in the vessel were preheated with a steam of 0.2 kg/cm$^2$G for 10 seconds and heated with a steam of 1.0 kg/cm$^2$G for 5 seconds with releasing pressure to fuse expanded particles. After cooling, expanded particle moldings were taken out of the mold. The moldings were aged in a thermostatic chamber at 75° C. for 6 hours and allowed to stand at room temperature for 3 days. The resultant expanded particle moldings had a bulk density of 0.034 g/cm$^3$ and a void volume of 7%.

Ten of the obtained expanded particle moldings were placed in an autoclave having an inner volume of 20 liters and equipped with 4 sets of rotors along the axis of rotation. After introducing steam, the moldings were treated at 106°, 110°, 116° and 120° C., respectively, for 3 minutes with stirring at 30 r.p.m. to separate and recover expanded particles from the moldings. The characteristics of the obtained recycled expanded particles are shown in Table1. The recycled expanded particles were as moldable by the same method as virgin expanded particles.

EXAMPLE 2

Expanded particles were prepared by the same method as described in Example 1 except that polyethylenes having melting points of 113° and 85° C., respectively were used as the interfacial material.

The polyethylene having a melting point of 113° C. was contacted with base expanded particles at 115° C. so that the base expanded particles shrinked. When the polyethylene having a melting point of 85° C. was used, the bond strength among the expanded particles of moldings was not satisfied due to insufficient fusion between the interfacial material and the base expanded particles. Using these particles, expanded particle moldings were obtained by the same method as described in Example 1 under conditions shown in Table1. Then, recycled expanded particles were obtained from the moldings. The characteristics of the resultant particles are shown in Table 1.

EXAMPLE 3

Recyclable expanded particles were recovered by the same method as described in Example 1 except that 25 wt. % of interfacial material was used. The characteristics of the obtained particles are shown in Table 1.

Comparative Example 1

Expanded particles having a true density of 0.032 g/cm$^3$ were recovered by the same method as described in Example 1 except that interfacial material was not used.

The obtained expanded particles were molded by the same method as described in Example 1 except that a steam of 1.2 kg/cm$^2$G was used. The obtained expanded particle moldings had a bulk density of 0.034 g/cm$^3$ and a void volume of 0.4%.

The blocks of the obtained moldings were placed in the autoclave used in Example 1 and heated at 106° C. for 2 minutes with stirring at 30 r.p.m., but expanded particles were not separated.

EXAMPLE 4

Using the low density polyethylene employed in Example 1, expanded cross-linked polyethylene particles having a true density of 0.25 kg/cm$^3$ were produced by the same method as described in Example1. The obtained expanded particles were charged into a pressure vessel to provide expandability by treating at 80° C. for 8 hours under nitrogen gas of 15 kg/cm$^2$G. The above-treated particles were further charged into an expanding tank and expanded under a steam of 0.65 kg/cm$^2$G for 20 seconds to obtain expanded particles having a true density of 0.066 kg/cm$^3$. The particles having a true density of 0.066 kg/cm$^3$ were charged into a pressure vessel to provide expandability by treating at 80° C. for 8 hours under nitrogen gas of 15 kg/cm$^2$G. The particles having expandability were charged into an expanding tank, and expanded with a steam of 0.65 kg/cm$^2$G for 12 seconds to obtain expanded particles having a true density of 0.035 kg/cm$^3$. A bulk volume of 50 liters of the resultant expanded particles was placed in a stirring mixer (manufactured by Pacific Machinery & Engineering Co., Ltd. under the trade name of Plow Share Mixer WB-75 type) having inner volume of 80 liters with plural rotors in the form of a plow. The mixer was adjusted so that the surface temperature of the expanded particles was in the range of 100° to 102° C.

14 wt. % of polyethylene (manufactured by Asahi Chemical Industry Co., Ltd. under the trade name of Suntec® LD; melting point of 92° C.) based on the total weight of the base expanded particles was supplied little by little as interfacial material and the particles were mixed for 4 minutes. The expanded particles, in a fluidized state, were cooled to a surface temperature of 85° C., and thus expanded particles completely coated with the interfacial material were obtained.

The obtained expanded particles were molded in a mold by the same method as described in Example 1 to obtain expanded particle moldings having a bulk density of 0.040 g/cm³ and a void volume of 5%.

The blocks of the obtained moldings were heated at 98°, 105° and 112° C., respectively, for 2 minutes with stirring at 30 r.p.m. by using the same apparatus employed in Example 1 to separate and recover the expanded particles from the moldings. The characteristics of the recycled expanded particles are shown in Table 2. The recycled expanded particles were as moldable as virgin expanded particles.

EXAMPLE 5

Particles of non-cross-linked ethylene-propylene random copolymer containing 8 wt. % of ethylene (manufactured by Chisso Co., Ltd. under the trade name of Chisso PORIPURO®; average particle diameter: 1.3 mm; DSC low-melting point: 134° C.; $Pe_{(N_2)}=4\times10^{-10}$ cm³·cm/cm²·sec·cmHg; $Pe_{(C_3H_8)}=3\times10^{-10}$ cm³·cm/cm²·sec·cmHg) were charged into a pressure vessel and allowed to stand at 10° C. for 5 hours under carbondioxide of 30 kg/cm²G. The particles taken out from the vessel were immediately charged into an expanding tank and heated with a steam of 1.8 kg/cm²G for 30 seconds to obtain expanded particles having a true density of 0.035 g/cm³. The above obtained expanded particles were charged into a pressure vessel and allowed to stand at 95° C. for 8 hours under nitrogen gas of 15 kg/cm²G to provide expandability. The particles having expandability were charged into an expanding tank and heated with a steam of 1.9 kg/cm²G for 20 seconds to obtain expanded particles having a true density of 0.080 kg/cm³.

The resultant expanded particles were put in the plow share mixer used in Example 4. The mixer was adjusted so that the surface temperature of the expanded particles was in the range of 127° to 129° C.

10 wt. % of powder polypropylene (manufactured by Chisso Co., Ltd. under the trade name of Chisso PORIPURO®: melting point of 127° C.) based on the total weight of the expanded particles were added little by little as an interfacial material to the base expanded particles and mixed for 4 minutes. The surface temperature of the expanded particles, in a fluid state, was cooled to 100° C. to obtain expanded particles whose whole surfaces were firmly coated with the interfacial material. The coated particles were charged into a pressure vessel and allowed to stand at 95° C. for 8 hours under nitrogen gas of 15 kg/cm²G. Then, they were further charged into an expanding tank and heated with a steam of 1.95 kg/cm²G for 12 seconds to obtain expanded particles having a true density of 0.035 kg/cm³.

The resultant expanded particles were molded in a mold by the same method as described in Example 1 to obtain expanded particle moldings having a bulk density of 0.034 g/cm³ and a void volume of 5%.

Using the same apparatus employed in Example 1, the blocks of the obtained moldings were heated at 128° C. and 132° C. for 2 minutes with stirring at 100 r.p.m. to separate and recover expanded particles from the moldings. The characteristics of the resultant recycled expanded particles are shown in Table 2. The recycled expanded particles were as moldable by the same method as virgin expanded particles.

EXAMPLE 6

Moldings comprising expanded particles of polystyrene having a bulk density of 0.025 kg/cm³ were produced by the same method as described in Example 4 except that expanded particles of polystyrene having a true density of 0.03 kg/cm³ (manufactured by Sekisui Plastics Co., Ltd.; $Pe_{(N_2)}=0.7\times 10^{-10}$ cm³·cm/cm²·sec·cmHg; $Pe_{(C_3H_8)}=0.001\times 10^{-10}$ cm³·cm/cm²·sec·cmHg; Vicat softening point: 105° C.) and polystyrene having Vicat softening point of 95° C. (manufactured by Sekisui Plastics Co., Ltd.) were used as the base expanded particles and interfacial material, respectively. From the obtained moldings, recyclable expanded particles could be recovered by the same method as described in Example 1.

EXAMPLE 7

0.02 part by weight of divinyl benzene was added to 100 parts by weight of a resin composing of vinylidene chloride, N-phenylmaleinimide, acrylonitrile and styrene in a component ratio of 40/2/45/13 (mole %) and subjected to suspension polymerization to obtain copolymer resin particles ($Pe_{(N_2)}<0.01\times 10^{-10}$ cm³·cm/cm²·sec·cmHg, $Pe_{(C_3H_8)}<0.01\times10^{-10}$ cm³·cm/cm²·sec·cmHg). The resultant particles were impregnated with 10 wt. % of furon-142b based on the total weight of the copolymer resin particles and heated with a steam of 0.1 kg/cm²G to obtain expanded particles having a true density of 0.05 kg/cm³.

100 parts by weight of the obtained expanded particles and 200 parts by weight of 5% toluene solution containing ABS resin (manufactured by Asahi Chemical Industry Co., Ltd. under the trade name of stylac® 3941) were charged in a ribbon blender and mixed for 15 minutes. Then, they were dried with warm air at 35° C. to obtain expanded particles whose surface was coated with ABS resin.

Using an automatic molding equipment for expanded polystyrene, the obtained expanded particles were molded in a mold having a size of 100 mm×100 mm×50 mm and heated with a steam of 0.2 kg/cm²G for 30 seconds to obtain expanded particle moldings having a bulk density of 0.03 kg/cm² and a void volume of 18%.

Immediately after the obtained moldings were sprayed with 1-toluene, five of them were placed in the autoclave used in Example 1 and stirred at 300 r.p.m. for 2 minutes to separate and recover recycled expanded particles from the surface of the moldings. The recycled expanded particles contained a blowing agent. They were moldable by the same method already described in the present Example.

EXAMPLE 8

Using low density polyethylene employed in Example 1, expanded particles of cross-linked polyethylene were produced by the same method as described in Example 1. Then, they were treated by the same method as described in Example 4 to obtain expanded particles having a true density of 0.035 g/cm³.

A bulk volume of 50 liters of the obtained expanded particles were placed in the stirring mixer which was used in Example 4. 150 g of a polyurethane resin adhesive (manufactured by Sanyo Chemical Industries, Ltd. under the trade name of Unoflex; solid content of 55 wt. %) having viscosity of 100 cps at 20° C. was added to the mixer and stirred at 60 r.p.m. for 2 minutes to coat the surface of the expanded particles with the adhesive to an approximately uniform thickness. A bulk volume of 600 cm³ of the coated expanded particles was immediately charged into a mold with 1 mm diameter vent holes in 5 mm pitches, and pressed with a face of the mold so that the bulk volume of the expanded particles was reduced to 70%. Continuously, the particles were cured at room temperature for 24 hours to obtain moldings having a size of about 100 mm×100 mm×50 mm. The obtained expanded particle moldings had a bulk density of 0.034 g/cm$^3$ and a void volume of 10%.

After being immersed in toluene for 10, 30 and 50 minutes, respectively, the expanded particle moldings were taken out to remove toluene present on their surfaces. Then, 10 of them were immediately placed in the autoclave used in Example 1. While introducing air, to remove vaporized solvent to the outside of the autoclave, they were stirred at 300 r.p.m. for 2 minutes to separate and recover recyclable expanded particles from the surface of the moldings. The characteristics of the obtained recyclable expanded particles are shown in Table 3. The recycled expanded particles were moldable by the same method already described in the present Example.

Industrial Applicability

According to the process of the present invention, recyclable expanded particles can be recovered readily and with a high degree of conversion of moldings into particles. The recovered expanded particles are hardly damaged, show high anti-blocking, and have a similar expansion ratio to virgin expanded particles so that they can be used as materials for expanded particle moldings by mixing with virgin particles. Using the obtained expanded particles, moldings having a high percentage of closed cells can be also produced. Therefore, the process of the present invention makes recycling expanded particle moldings easy, and reduces the need to dispose of and bury moldings. As described in the above, the present invention provides a process for easily recovering expanded particles from expanded particle moldings with low energy and cost. Moreover, these are excellent advantages from the standpoint of recycling natural resources and protecting the environment.

TABLE 1

| Ex. | Melting point of substance (°C.) | Melting point of interfacial material (°C.) | Steam temp. for heating at separating expanded particles (°C.) | Ratio of interfacial material in expanded particles (wt. %) | True density of virgin expanded particles (ρA) (g/cm$^3$) | True density of recycled expanded particles (ρB) (g/cm$^3$) | ρB/ρA | Degree of conversion of moldings into particles (%) | Percentage of closed cells (%) | Blocking property (%) |
|---|---|---|---|---|---|---|---|---|---|---|
| 1 | 117 | 104 | 106 | 6 | 0.035 | 0.036 | 1.03 ⊙ | 83 ○ | 93 ⊙ | 0.8 ⊙ |
|   | 117 | 104 | 110 | 6 | 0.035 | 0.038 | 1.09 ○ | 93 ⊙ | 91 ⊙ | 0.8 ⊙ |
|   | 117 | 104 | 116 | 6 | 0.035 | 0.040 | 1.14 ○ | 95 ⊙ | 87 ○ | 0.8 ⊙ |
|   | 117 | 104 | 120 | 6 | 0.035 | 0.042 | 1.20 Δ | 95 ⊙ | 75 Δ | 0.8 ⊙ |
| 2 | 117 | 113 | 115 | 6 | 0.042 | 0.049 | 1.16 Δ | 81 ○ | 88 ○ | 1.5 ○ |
|   | 117 | 85  | 92  | 6 | 0.035 | 0.036 | 1.03 ⊙ | 99 ⊙ | 95 ⊙ | 6 Δ |
| 3 | 117 | 104 | 110 | 25 | 0.041 | 0.044 | 1.07 ○ | 92 ⊙ | 91 ⊙ | 15 Δ |

TABLE 2

| Ex. | Melting point of substance (°C.) | Melting point of interfacial material (°C.) | Steam temp. for heating at separating expanded particles (°C.) | Ratio of interfacial material in expanded particles (wt. %) | True density of virgin expanded particles (ρA) (g/cm³) | True density of recycled expanded particles (ρB) (g/cm³) | ρB/ρA | Evaluation Degree of conversion of moldings into particles (%) | Percentage of closed cells (%) | Blocking property (%) |
|---|---|---|---|---|---|---|---|---|---|---|
| 4 | 117 | 92 | 98 | 14 | 0.042 | 0.043 | 1.02 ⊙ | 91 ⊙ | 95 ⊙ | 3.5 ○ |
|  | 117 | 92 | 105 | 14 | 0.042 | 0.044 | 1.05 ⊙ | 94 ⊙ | 92 ⊙ | 3.5 ○ |
|  | 117 | 92 | 112 | 14 | 0.042 | 0.045 | 1.07 ○ | 96 ⊙ | 89 ○ | 3.5 ○ |
| 5 | 134 | 127 | 128 | 10 | 0.035 | 0.038 | 1.09 ○ | 83 ○ | 91 ⊙ | 0.7 ⊙ |
|  | 134 | 127 | 132 | 10 | 0.035 | 0.040 | 1.14 ○ | 92 ⊙ | 90 ⊙ | 0.7 ⊙ |

TABLE 3

| Ex. | Immersion period in toluen (min.) | True density of virgin expanded particles (ρA) (g/cm³) | True density of recycled expanded particles (ρB) (g/cm³) | ρB/ρA | Evaluation Degree of conversion of moldings into particles (%) | Percentage of closed cells (%) | Blocking property (%) |
|---|---|---|---|---|---|---|---|
| 8 | 10 | 0.035 | 0.036 | 1.03 ⊙ | 83 ○ | 94 ⊙ | 2.0 ○ |
|  | 30 | 0.035 | 0.037 | 1.06 ○ | 91 ⊙ | 90 ⊙ | 1.5 ○ |
|  | 50 | 0.035 | 0.036 | 1.03 ⊙ | 96 ⊙ | 89 ○ | 0.8 ⊙ |

What is claimed is:

1. A process for recovering expanded particles from an expanded particle molding comprising expanded particles of a synthetic resin coated with a thermoplastic resin whose melting point is lower than that of the synthetic resin of the expanded particles, which process comprises the steps of:

softening or melting the thermoplastic resin by heating, and separating the molding into individual expanded particles by applying a shearing force to the molding under circumstances such that bond strength among the expanded particles is weakened.

2. The process according to claim 1, wherein the synthetic resin of the expanded particles has the following gas permeability:

$Pe_{(N_2)} \geq 0.2 \times 10^{-10}$ cm³·cm/cm²·sec·cmHg, and $Pe_{(C_3H_8)} \geq 0.5 \times 10^{-10}$ cm³·cm/cm²·sec·cmHg.

3. The process according to claim 1, wherein the synthetic resin of the expanded particles has the following gas permeability:

$Pe_{(N_2)} < 0.2 \times 10^{-10}$ cm³·cm/cm²·sec·cmHg, and $Pe_{(C_3H_8)} < 0.5 \times 10^{-10}$ cm³·cm/cm²·sec·cmHg.

4. The process according to claim 1, wherein the synthetic resin of the expanded particles comprises a polyolefin.

5. The process according to claim 1, wherein the synthetic resin of the expanded particles comprises a vinylidene chloride polymer.

6. The process according to claim 1, wherein the heating is conducted at or below the melting point of the synthetic resin of the expanded particles.

7. The process according to claim 1, wherein the melting point of the thermoplastic resin is lower than that of the synthetic resin of the expanded particles by 5° to 30° C.

8. The process according to claim 1, wherein the expanded particle moldings has a void volume of 0.5 to 40%.

9. The process according to claim 1, wherein the thermoplastic resin accounts for 0.05 to 20 wt. % based on the weight of the expanded particle molding.

10. A process for recovering expanded particles from an expanded particle molding comprising expanded particles of polyolefin coated with thermoplastic resin whose melting point is lower than that of the polyolefin by 5° to 30° C., which process comprises the steps of softening or melting the thermoplastic resin by heating at or below the melting point of the polyolefin and separating into individual particles by applying a shearing force to the molding under circumstances such that the bond strength among the expanded particles is weakened.

11. The process according to claim 10, wherein the thermoplastic resin is a polyolefin.

12. The process according to claim 1, wherein the heating is carried out with steam.

13. The process according to claim 1, wherein the shearing force is applied to the molding for from about 2 to about 10 minutes.

14. The process according to claim 1, wherein the individual expanded particles have a similar expansion ratio to virgin expanded particles.

15. The process according to claim 1, wherein the molding is separated into individual expanded particles having an expansion ratio S of b $0.7 \leq S \leq 1.3$.

16. A process for recovering expanded particles from a molding comprising expanded particles of a synthetic resin coated with a thermoplastic resin whose melting point is lower than that of the synthetic resin of the expanded particles, which process comprises the steps of:

softening or melting the thermoplastic resin by heating at a temperature at which the expanded particles of the molding are separated by a shearing force without mechanical damage, and separating the molding into individual expanded particles by applying a shearing force to the molding under circumstances such that bond strength among the expanded particles is weakened.

* * * * *